United States Patent
Flacher et al.

(10) Patent No.: US 8,162,659 B2
(45) Date of Patent: Apr. 24, 2012

(54) METHOD FOR INTRODUCING WASTE AND/OR ALTERNATIVE FUELS INTO A CLINKER PRODUCTION METHOD AND DEVICE FOR CARRYING OUT SAID METHOD

(75) Inventors: Alexander Flacher, Holderbank (CH); Werner Voramwald, Holderbank (CH)

(73) Assignee: Holcim Technology Ltd., Jona (CH)

( * ) Notice: Subject to any disclaimer, the term of this patent is extended or adjusted under 35 U.S.C. 154(b) by 327 days.

(21) Appl. No.: 12/311,813

(22) PCT Filed: Oct. 17, 2007

(86) PCT No.: PCT/IB2007/003094
§ 371 (c)(1),
(2), (4) Date: Apr. 14, 2009

(87) PCT Pub. No.: WO2008/047213
PCT Pub. Date: Apr. 24, 2008

(65) Prior Publication Data
US 2010/0175591 A1    Jul. 15, 2010

(30) Foreign Application Priority Data
Oct. 19, 2006    (AT) ................................ A 1757/2006

(51) Int. Cl.
*F27B 7/32*    (2006.01)
(52) U.S. Cl. ..................................... 432/117; 110/101 R
(58) Field of Classification Search .................. 432/117, 432/109, 105; 110/101 R, 110, 246
See application file for complete search history.

(56) References Cited

U.S. PATENT DOCUMENTS

| 3,794,483 | A | * | 2/1974 | Rossi ............................ 423/138 |
| 4,296,072 | A | * | 10/1981 | Takacs et al. .................. 422/254 |
| 4,930,965 | A | * | 6/1990 | Peterson et al. ............... 414/149 |
| 5,257,586 | A | * | 11/1993 | Davenport ..................... 110/246 |
| 5,454,333 | A |   | 10/1995 | Von Seebach et al. |
| 5,555,823 | A | * | 9/1996 | Davenport ..................... 110/346 |
| 6,050,203 | A | * | 4/2000 | Reese et al. ................... 110/246 |
| 6,273,009 | B1 | * | 8/2001 | Magnusson ..................... 110/346 |
| 6,474,985 | B1 | * | 11/2002 | Miller et al. .................... 432/117 |

FOREIGN PATENT DOCUMENTS

| DE | 196 37 848 A1 | 3/1998 |
| JP | 2003-137620 A | 5/2003 |
| JP | 2004-000985 A | 1/2004 |
| JP | 2004-123513 A | 4/2004 |

OTHER PUBLICATIONS

Lexikon Der Verfahrenstechnik, "Prallmühlen," Deutsche Verlags-Anstalt, Stuttgart, 1970; p. 364.
Meyers Enzyklopädisches Lexikon, "Mühle," Bibliographisches Institut, Mannheim/Wien/Zürich, Lexikonverlag, 1976, pp. 565-566.

* cited by examiner

*Primary Examiner* — Gregory A Wilson
(74) *Attorney, Agent, or Firm* — Chapman and Cutler LLP

(57) ABSTRACT

In a method for introducing waste substances and/or alternative fuels into a clinker production process, the raw materials, in the form of slurries or suspensions, are subjected to mechanical deagglomeration as a pumpable mass. The pumpable mass is ejected into risers, precalciners and/or the rotary tubular kiln. The device for carrying out the method is characterized by a tubular housing (1) including a rotor (2) mounted to be rotational substantially concentrically with the tube axis and driveable for rotation with blades (3) sweeping over the space between the rotor shaft and the housing wall, wherein a plurality of ducts and openings (6, 7, 11, 14) are connected to the shell of the tubular housing (1), and at least one duct (6) is arranged with the slurry supply and at least one duct is offset in the peripheral direction.

9 Claims, 1 Drawing Sheet

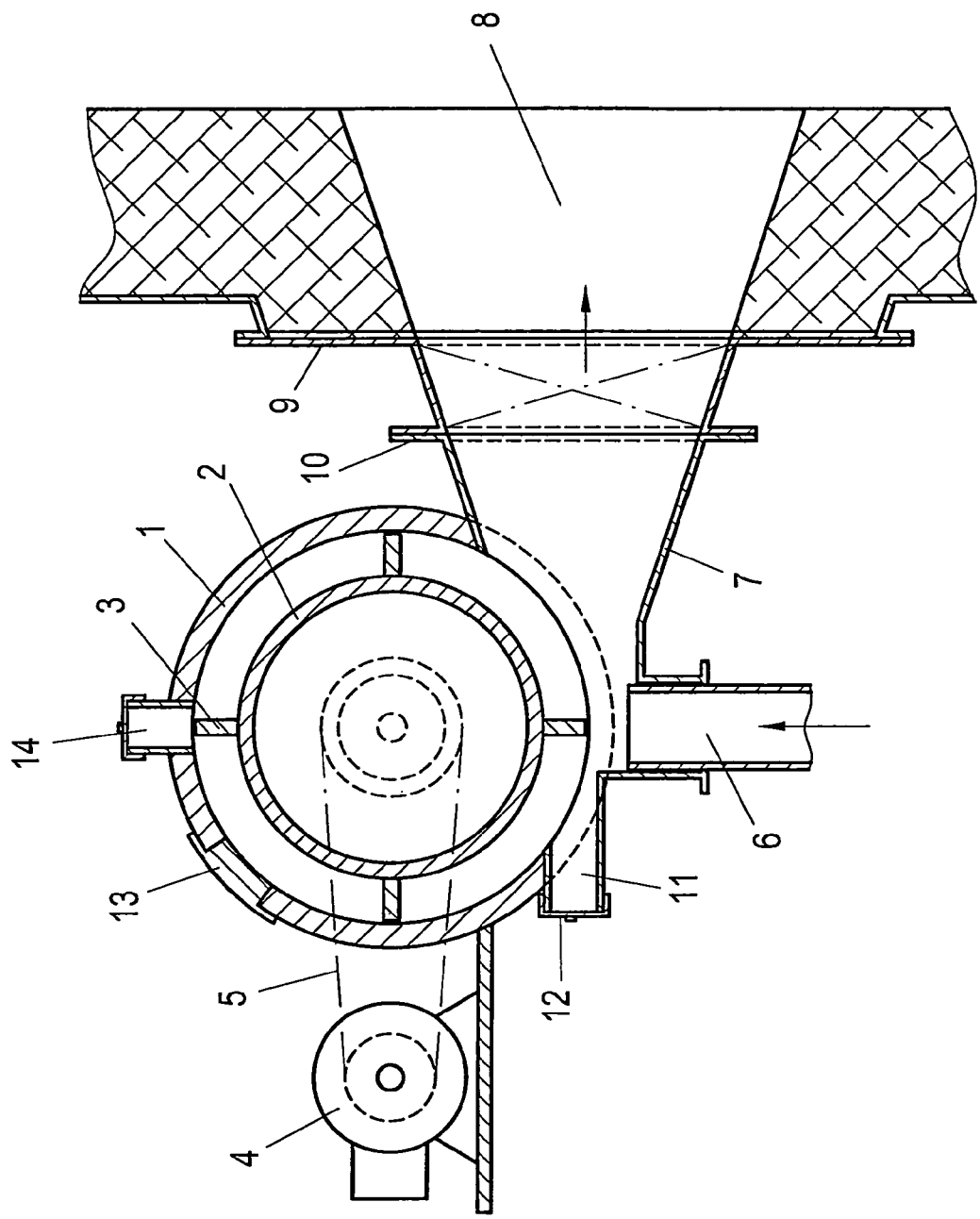

METHOD FOR INTRODUCING WASTE AND/OR ALTERNATIVE FUELS INTO A CLINKER PRODUCTION METHOD AND DEVICE FOR CARRYING OUT SAID METHOD

The invention relates to a method for introducing waste substances and/or alternative fuels into a clinker production process and a device for carrying out said method.

As a rule, waste substances and alternative fuels occur in different states of matter and different compositions. It is, for instance, known to transport used tires through suitable conveying means to an appropriate feeding point provided at a rotary tubular kiln of a clinker production plant, wherein the respective plant parts have to be adapted to the dimensions of used tires and to the respective masses of such waste substances to be reasonably supplied. Different solids usually occurring in different shapes either call for conveying and feeding devices especially adapted to those shapes or require an appropriate disintegration of the material into bulk material to be supplied to a suitable feeding point. In the event of mechanically disintegrated solids, the chemical composition of the disintegrated raw material will, however, vary by a relatively large extent as a function of the different waste substances and/or different alternative fuel materials.

A standardization of the respective conveying and feeding devices will basically be feasible by converting the starting materials into uniform shapes and/or uniform states of matter. In principle, alternative fuels can, for instance, be burned or gasified in separate reactors such that the desired energy will subsequently be available in the form of gaseous substances capable of being introduced into the clinker production process at a suitable point. Waste substances occurring in liquid form can be injected in a suitable manner through nozzles. However, the predominantly major portion of waste substances is, as a rule, not directly usable in clinker production unless pretreated by sumptuous methods.

The invention aims to provide a method of the initially defined kind, which enables the introduction of a large number of different starting materials into a clinker production process at different points using standardized devices. To this end, the method according to the invention essentially consists in that the raw materials, in the form of slurries or suspensions, are subjected to mechanical disintegration as a pumpable mass, and that the pumpable mass is ejected into risers, precalciners and/or the rotary tubular kiln. The use of raw materials in the form of slurries or suspensions allows for the formation of a pumpable mass with little expenditures, which can be transported through appropriate duct systems. Yet, such a pumpable mass, which merely has to comply with the minimum requirements in terms of pumpability, as a rule contains more or less large solids portions as a function of the composition of the starting products or waste substances, which can be readily transported as a pumpable mass after the formation of the slurry or suspension. However, depending on the chemical compositions of the solids it might subsequently not be safely feasible to completely react the latter even in a rotary tubular kiln, which would consequently considerably affect the homogeneity and composition of the end product. When using a pumpable mass, the method according to the invention now recommends to perform a mechanical disintegration, which, using such a pumpable mass, can be achieved with particularly simple-structured devices. Such a mechanical disintegration can be directly achieved with appropriate conveying devices or injection devices such that the method according to the invention will be suitable for the use of different, alternative fuels and different waste substances without any major modifications. In an advantageous manner, the method is carried out such that the raw materials are precrushed to a maximum particle size of 100 mm, preferably 80 mm, before being suspended and subjected to further disintegration. By limiting the solids portion to a maximum particle size of 100 to 80 mm, the pumpability will still be readily ensured, such a particle size offering the possibility of ensuring the final deagglomeration in the region of the feeding point by the aid of an appropriate ejection or introduction device. In this respect, it is advantageously proceeded in a manner that solid waste substances are subjected to disintegration and homogenization along with waste slurries.

The device according to the invention for carrying out said method is substantially characterized by a tubular housing including a rotor mounted to be rotational substantially concentrically with the tube axis and driveable for rotation with blades sweeping over the space between the rotor shaft and the housing wall, wherein a plurality of ducts and openings are connected to the shell of the tubular housing, and at least one duct is arranged with the slurry supply and at least one duct is offset in the peripheral direction. Thus, simple-structured devices which are hardly prone to wear are employed, whereby the rotor, which is drivable for rotation with the blades sweeping over the free space at an appropriate rotational speed, will ensure the desired disintegration simultaneously with the desired injection into the respectively provided connection point in the clinker production process. The plurality of ducts or openings connected to the shell of a device of this type can actually be used for various additional purposes. With an accordingly high rotational speed, excessive heating of the housing can be avoided by introducing cooling air into the free space swept by the rotor. Similarly, a fluid may be injected for cleaning purposes.

In an advantageous manner, the configuration is devised such that the blades are comprised of radially oriented, axially-parallelly extending plates, such axially-parallelly extending plates acting as beater blades. Since these plates may be located on relatively large diameters, a high relative speed between rotating plates and the material to be injected can be achieved at a low number of revolutions, the impact of these beater blades on the material causing appropriate mechanical deagglomeration while, at the same time, enabling the injection of the material into the feed opening provided therefore. In this respect, the configuration is advantageously devised such that the housing comprises additional openings running into the annular space for charging additional liquid or gaseous media. These additional openings may, however, also be designed as inspection openings for cleaning purposes, especially simple cleaning of the mechanical disintegration device being ensured in that an opening substantially tangentially connected to the annular space, in particular, comprises a discharge cone for the disintegrated and homogenized pumpable mass substantially in alignment with the discharge opening.

In order to interrupt the injection of the disintegrated material, it may be proceeded such that the discharge opening is closed while the rotor is still rotating, to which end the configuration is advantageously devised such that the discharge opening for the pumpable mass comprises a closing member, in particular a closing slide. In order to enable a particularly simple and accordingly stable fixation of the device according to the invention in, for instance, the region of the cold end of a rotary tubular kiln, the configuration is advantageously devised such that the device, in the region of the discharge opening, comprises a fixing flange for fixation to an inlet opening running into the clinker production plant.

In the following, the invention will be explained in more detail by way of an exemplary embodiment schematically illustrated in the drawing. In the drawing, 1 denotes the housing of the disintegration device. A rotor 2 comprising blades 3 is arranged in the interior of the tubular housing 1 coaxially therewith, said blades being designed as substantially axially parallel battens. The drive motor is schematically indicated by 4 and serves to drive the rotor 2 at an accordingly high number of revolutions via driving belts indicated by 5, thus causing the blades 3 in the region of the supply of material to be disintegrated to impinge on the latter at a high speed. Said supply is realized through the connection or duct 6, via which pumpable mass is introduced, whose solids portion is disintegrated by the rotating blades or battens 3 impinging on the solids. Discharging takes place to the cold end 8 of a rotary tubular kiln via a discharge cone 7, whose fixation is feasible in a particularly simple and stable manner via a flange 9. By 10, a slide is denoted, by means of which the discharge opening can be closed. A cleaning opening 11 whose lid is denoted by 12 is tangentially connected to the housing 1 in a manner substantially coaxial with the discharge cone. A lid for an inspection opening is denoted by 13. Via a connection 14, additional cooling air may, for instance, be fed to the rotor in order to avoid overheating. Via the cleaning opening 11, naturally upon removal of its lid, air, gas or a liquid may likewise be injected, which, along with the pumpable slurry supplied via the connection 6, can be ejected into the cone 7 and hence into the rotary tubular kiln.

The invention claimed is:

1. A device for introducing waste substances and/or alternative fuels into a clinker production process, comprising:
   a tubular housing (1) comprising a rotor (2) mounted to be rotational substantially concentrically with an axis of the tubular housing and to be driveable for rotation, said rotor comprising blades (3) arranged to sweep over an annular space between a rotor shaft of the rotor and a wall of the tubular housing, wherein
   the blades (3) are comprised of radially oriented, axially-parallelly extending plates,
   a plurality of ducts and openings are connected to a shell of the tubular housing (1),
   at least a first one of said ducts (6) is arranged for input of a slurry supply,
   at least a second one of said ducts is arranged to be offset in a peripheral direction, and
   a first one of said openings is a discharge opening substantially tangentially connected to the annular space, said discharge opening comprising a discharge cone (7) that is configured for discharge of a disintegrated and homogenized pumpable mass and is positioned substantially in alignment with the discharge opening.

2. A device according to claim 1, wherein the housing (1) comprises additional openings (11, 14) running into the annular space for charging cleaning fluids or gaseous media.

3. A device according to claim 2, wherein the discharge opening for the pumpable mass comprises a closing member.

4. A device according to claim 3, further comprising a fixing flange (9) positioned in a region of the discharge opening for fixation to an inlet opening running into a clinker production plant.

5. A device according to claim 2, further comprising a fixing flange (9) positioned in a region of the discharge opening for fixation to an inlet opening running into a clinker production plant.

6. A device according to claim 1, wherein the discharge opening for the pumpable mass comprises a closing member.

7. A device according to claim 6, wherein the closing member is a closing slide.

8. A device according to claim 6, further comprising a fixing flange (9) positioned in a region of the discharge opening for fixation to an inlet opening running into a clinker production plant.

9. A device according to claim 1, further comprising a fixing flange (9) positioned in a region of the discharge opening for fixation to an inlet opening running into a clinker production plant.

\* \* \* \* \*